United States Patent
Quesada Barbero et al.

(10) Patent No.: US 12,434,407 B2
(45) Date of Patent: Oct. 7, 2025

(54) CUTTING DEVICE FOR MANUAL CERAMIC CUTTERS

(71) Applicant: GERMANS BOADA, S.A., Rubi (ES)

(72) Inventors: Juan Antonio Quesada Barbero, Rubi (ES); David Martínez Galindo, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 0 days.

(21) Appl. No.: 18/260,163

(22) PCT Filed: Nov. 12, 2021

(86) PCT No.: PCT/ES2021/070819
§ 371 (c)(1),
(2) Date: Jun. 30, 2023

(87) PCT Pub. No.: WO2023/084134
PCT Pub. Date: May 19, 2023

(65) Prior Publication Data
US 2024/0058991 A1 Feb. 22, 2024

(51) Int. Cl.
*B28D 1/22* (2006.01)

(52) U.S. Cl.
CPC .................. *B28D 1/225* (2013.01)

(58) Field of Classification Search
CPC .......... B28D 1/225; B28D 1/24; B28D 1/228; B23B 2231/2097
See application file for complete search history.

(56) References Cited

U.S. PATENT DOCUMENTS

| 1,579,995 A | * | 4/1926 | Aubuchont | .......... | B26D 7/2635 |
|---|---|---|---|---|---|
| | | | | | 83/886 |
| 1,750,718 A | * | 3/1930 | Lenston | ............... | B26D 7/2635 |
| | | | | | 83/886 |
| 1,995,741 A | * | 3/1935 | Granite | .................. | B28D 1/225 |
| | | | | | 125/23.02 |

(Continued)

FOREIGN PATENT DOCUMENTS

| ES | 1047002 | 2/2001 |
| ES | 2365909 | 10/2011 |

(Continued)

OTHER PUBLICATIONS

WIPO, International Search Report for PCT/ES2021/070819, Aug. 8, 2022.

*Primary Examiner* — Jonathan G Riley
(74) *Attorney, Agent, or Firm* — Hodgson Russ LLP

(57) ABSTRACT

The present invention relates to a cutting device for manual ceramic cutters. Disclosed is a cutting device for manual ceramic cutters, which comprises a support (1) provided with a vertical hole (11) for mounting a cutting tool (2), and a horizontal hole (12) in which are mounted a handle (3) and a rod (4) for attaching the cutting tool (2). The cutting tool (2) comprises a bar (21) that has at a first end (22) an inclined ramp (27) that facilitates the initial mounting thereof in the support (1), moving the rod (4) backwards and compressing a spring (5) for pushing the rod (4). The front face of the bar (21) comprises a longitudinal groove (26), and the rod (4) comprises a front appendage (42) accommodated in the longitudinal groove (26), immobilising the cutting tool in the support when pressed by the handle (3).

6 Claims, 4 Drawing Sheets

(56) References Cited

U.S. PATENT DOCUMENTS

| | | | | |
|---|---|---|---|---|
| 3,280,677 | A * | 10/1966 | Grzymislawski | C03B 33/10 83/881 |
| 3,399,586 | A * | 9/1968 | Insolio | C03B 33/10 83/881 |
| 3,459,078 | A * | 8/1969 | Black | B26D 7/2635 83/881 |
| 4,228,711 | A * | 10/1980 | Insolio | C03B 33/10 83/578 |
| 4,672,874 | A * | 6/1987 | Gach | C03B 33/12 83/881 |
| 4,770,156 | A * | 9/1988 | Boada Sucarrats | B28D 1/225 125/23.01 |
| 5,040,445 | A * | 8/1991 | Liou | B28D 1/225 83/886 |
| 5,381,713 | A * | 1/1995 | Smith | C03B 33/10 83/881 |
| 5,560,274 | A * | 10/1996 | Turner | B28D 1/225 83/886 |
| 6,164,272 | A * | 12/2000 | Fouy | B28D 1/225 125/35 |
| 6,269,994 | B1 * | 8/2001 | Harrington | B28D 1/225 225/96 |
| 7,013,785 | B2 * | 3/2006 | Torrents | B28D 1/225 83/676 |
| 8,375,932 | B2 * | 2/2013 | Comas | B28D 1/225 125/23.02 |
| 10,252,932 | B2 * | 4/2019 | Valiani | B26D 5/00 |
| 2004/0025662 | A1 * | 2/2004 | Torrents | B28D 1/225 83/886 |
| 2014/0238376 | A1 * | 8/2014 | Courtemanche | B28D 1/225 125/23.01 |
| 2018/0290335 | A1 * | 10/2018 | Rosello Gargallo | B28D 1/225 |
| 2018/0297237 | A1 * | 10/2018 | Guardia | B28D 1/225 |
| 2019/0193300 | A1 * | 6/2019 | Sarmiento | B28D 1/228 |
| 2020/0158150 | A1 * | 5/2020 | Su | F16B 5/0208 |
| 2024/0066755 | A1 * | 2/2024 | Quesada Barbero | B28D 1/225 |

FOREIGN PATENT DOCUMENTS

| | | | |
|---|---|---|---|
| GB | 2349845 A * | 11/2000 | B28D 1/225 |
| TW | 201404741 | 2/2014 | |

* cited by examiner

CUTTING DEVICE FOR MANUAL CERAMIC CUTTERS

CROSS-REFERENCE TO RELATED APPLICATION

This application is a U.S. national stage entry of International Application No. PCT/ES2021/070819, filed Nov. 12, 2021, the entire disclosure of which is incorporated herein by reference.

FIELD

The present invention can be used in the field of manual machines for cutting ceramic pieces, such as slabs, tiles and the like.

BACKGROUND

Manual machines for cutting ceramic pieces are currently known, which comprise a base for supporting the piece to be cut, and longitudinal guides on which a longitudinally movable runner is mounted and which, in turn, receives a cutting device capable of rotating about a horizontal shaft, perpendicular to said guides.

Said device comprises a support provided with a vertical hole for mounting a cutting tool and a horizontal threaded hole that receives a handle for fixing the cutting tool and for actuating same both in the rotation motion and the longitudinal movement.

The cutting tool comprises a bar provided with a first end that is inserted into the vertical hole of the support and a second end that receives a cutting wheel for marking a break line on the ceramic pieces.

The bar of the cutting tools, generally having a circular cross-section, comprises a flat front face, and at least one longitudinal, lateral or rear groove, which receives inside a respective appendage defined in the vertical hole of the support when the cutting tool is mounted on the support.

In patent ES 2 365 909 T3 of the same owner of the present invention, a cutting device of the aforementioned type is described and represented, wherein the bar of the cutting tool comprises a flat front face, two longitudinal grooves on its opposite sides and a longitudinal groove on its rear face.

The applicant has found that these cutting devices exhibit a number of drawbacks related to the mounting of the cutting tool on the support and to the immobilisation of said cutting tool in the mounting position.

One of these drawbacks, which affects the reliability of the cut and the operation of the cutting machine, is the possibility of mounting and attaching low-quality cutting tools or those that do not suitably fit the mounting hole defined in the support of the cutting device.

Another drawback is that during mounting, the cutting tool must be placed at a suitable height so that when the handle, which acts as a lever, is lowered, the cutting wheel makes contact with the ceramic piece to be cut. During said mounting, the user must hold the cutting tool with one hand and rotate the handle with the other hand so that it is threaded mounted into the horizontal hole of the support and presses with its front end the flat front face of the bar of the cutting tool.

Therefore, the technical problem that arises is the development of a cutting device for manual ceramic cutting machines, which prevents the mounting in the machine of cutting tools that do not exhibit specific features for this cutting device, which facilitates the centering, the variation in height and the attachment of the cutting tool with respect to the support.

SUMMARY

The cutting device for ceramic-cutting machines object of this invention exhibits a number of technical features that provide a series of advantages with respect to the prior art; specifically:

It prevents the mounting on the cutting device of other existing cutting tools, the hardness, reliability and duration of which are unknown, and which do not exhibit specific features for mounting thereof on said cutting device.

Holding the cutting tool with the hand while rotating the handle to attach same in the desired position is not required.

This cutting device for manual ceramic-cutting machines is of the type described in the preamble of the main claim and comprises a support provided with a vertical hole in which a cutting tool is accommodated, and a horizontal hole with at least one threaded rear segment that receives a handle capable of movement; said cutting tool comprising a bar provided with: a first end accommodated through the vertical hole of the support, a second end carrying a cutting wheel for marking a break line in the ceramic pieces to be cut, and a front face facing the aforementioned horizontal hole of the support.

According to the invention, to achieve the proposed objectives, the bar of the cutting tool comprises a longitudinal groove on said front face, and the device comprises a rod mounted in the horizontal hole of the support capable of longitudinal movement; said rod having at its front end a frontal appendage located inside the vertical hole of the support and which is accommodated in the longitudinal groove of the cutting tool, the rod immobilising the cutting tool when said rod is moved by the handle towards a front position for locking the cutting tool.

Since the frontal appendage of the rod protrudes from the horizontal hole and is located inside the vertical hole, said frontal appendage prevents cutting tools from being mounted on the support that do not have a suitable longitudinal groove to prevent their interference with the frontal appendage when the bar of the cutting tool is inserted into the vertical hole of the support.

Advantageously, according to the invention, the bar of the cutting tool comprises at its first end a ramp inclined towards its front face and which facilitates its insertion into the vertical hole of the support.

When the first end of the bar of the cutting tool is inserted into the vertical hole of the support and the rod is capable of longitudinal movement and in a forward position that even exceeds the bottom plane of the longitudinal groove of the cutting tool, the inclined ramp of said cutting tool acts against the frontal appendage causing its backward movement until said frontal appendage is accommodated in the longitudinal groove of the cutting tool. In this way, the inclined ramp facilitates the mounting of the first end of the bar of the cutting tool in the vertical hole of the support.

According to one embodiment of the invention, the device comprises a spring that acts against the rod and moves it towards the front position for locking the cutting tool. Said spring is mounted between an intermediate stop of the rod and an annular stop having an adjustable position, threaded mounted in the rear threaded segment of the support.

The technical advantage provided by this spring is that once the cutting tool is mounted in the vertical hole of the support, it ensures that the rod exerts a certain frontal pressure against the bar of the cutting tool, so that manually holding the tool with the hand is not required during the time that elapses from the time said mounting is carried out and the handle is actuated so that it acts against the rod and attaches same in the locking position of the cutting tool.

This feature also makes it easier to change the position in height of the cutting tool, since the cutting tool is kept under a certain pressure by the action of the spring against the rod, avoiding uncontrolled vertical movement of the cutting tool.

According to the invention, said spring is mounted between an intermediate stop of the rod and an annular stop, having an adjustable position, mounted on the rear threaded segment of the support. Arranging the annular stop in a more or less forward position, the length of the spring is modified, and consequently the pushing force transmitted by said spring to the rod and the pressure exerted by the rod against the bar of the cutting tool.

The horizontal hole of the support comprises a front stop, facing the intermediate stop of the rod, and the contact of which determines the extreme forward position of the rod with respect to the support.

In an exemplary embodiment, the frontal appendage of the rod and the longitudinal groove of the cutting tool exhibit vertical surfaces that converge respectively towards the front end of the frontal appendage and towards the bottom of the longitudinal groove, with the same lateral inclination, so that in the coupling position same guarantee a perfect centring and alignment of the cutting wheel with the forward direction of the cutting device in the ceramic cutter.

Preferably the frontal appendage of the rod and the longitudinal groove of the cutting tool exhibit a triangular or isosceles trapezoidal cross section.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
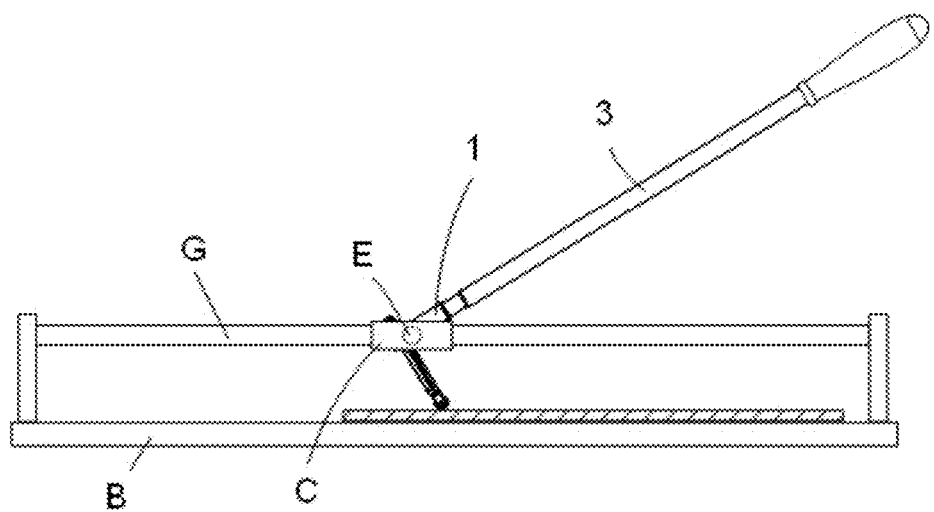
FIG. 1 shows a manual ceramic cutting machine, carrying the cutting device object of the invention.

FIG. 1 shows the cutting device of the invention mounted by means of a horizontal shaft (E) of rotation on a runner (C) that can be moved along longitudinal guides (G) of a manual ceramic cutter.

Figure 2:
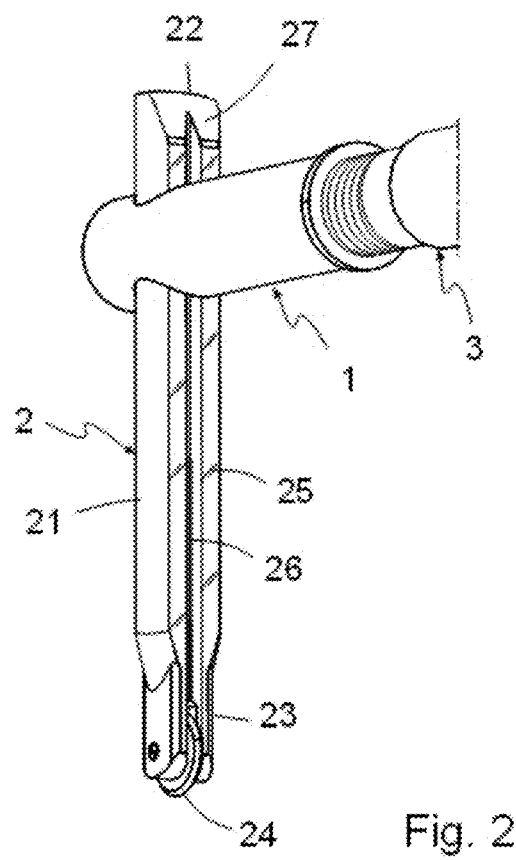
FIG. 2 shows a perspective view of the cutting device of the invention in which the rotation shaft of the support with respect to the runner for longitudinal movement on the guides of the cutting machine has been removed.

FIG. 2 shows the cutting device of the invention isolated and without the horizontal shaft (E) of rotation to simplify the drawing and wherein the support (1), the cutting tool (2) mounted on the support (1) and a front portion of the handle (3) for attaching and actuating the cutting tool can be observed.

The cutting tool (2) comprises a bar (21) provided with: a first end (22), a second end (23) carrying a cutting wheel (24) for marking a break line on the ceramic pieces and a frontal face (25). The cutting tool (2) comprises on the frontal face (25) a longitudinal groove (26) and on the first end of the bar (21) a ramp (27) inclined towards the frontal face (25).

Figure 3:
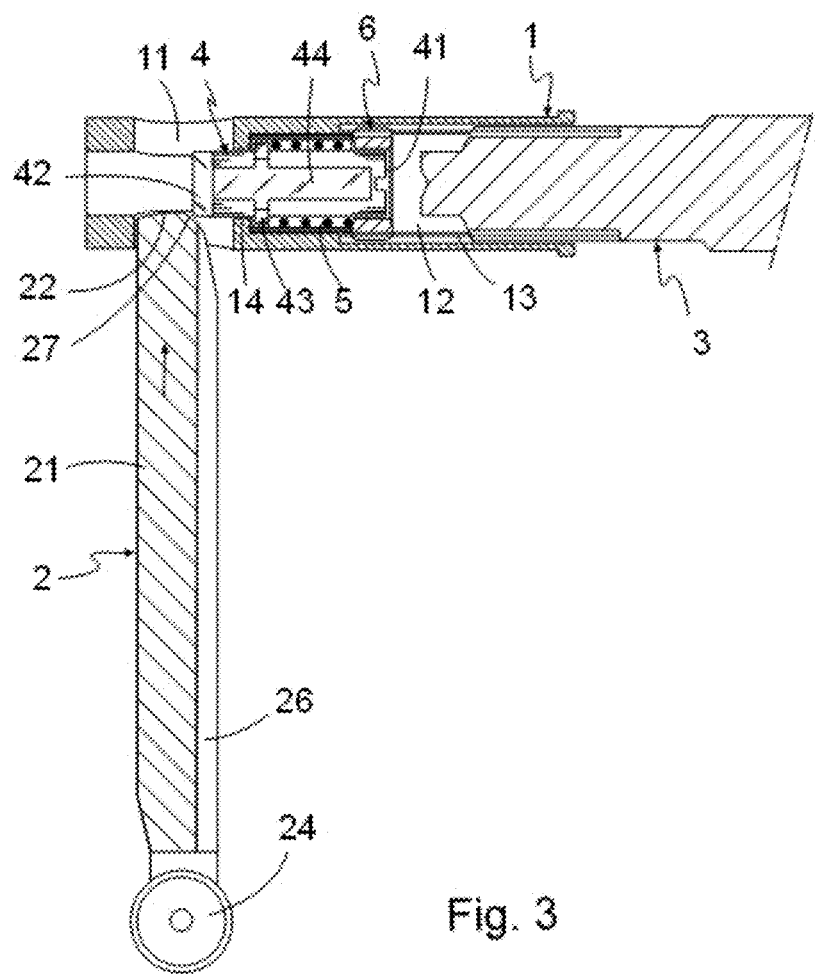
FIG. 3 shows an elevation view of the cutting device, vertically cross-sectioned, during the initial mounting of the cutting tool in the vertical hole of the support, with the handle in a rear position for releasing the cutting tool, and wherein the cutting tool acts with the ramp of its first end against the frontal appendage of the rod to cause its backward movement and allow the mounting of the cutting tool on the support.

FIG. 3 shows that the support (1) comprises a vertical hole (11) for mounting the cutting tool (2), and a horizontal hole (12) with a rear threaded segment (13) for threaded mounting of the annular stop (6) and of the front end of the handle (3); the rod (4) and the spring (5) for pushing the rod (4) being mounted in front of the annular stop (6).

Figure 4:
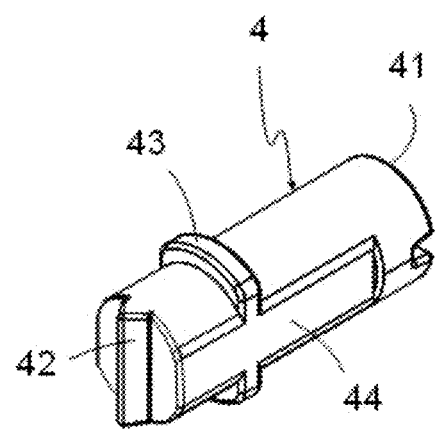
FIG. 4 shows a perspective view of an exemplary embodiment of the rod.

As shown in FIG. 4, the rod (4) comprises: a rear end (41) facing the handle (3); a frontal appendage (42), an intermediate stop (43) and lateral planes (44).

Going back to FIG. 3, the spring (5) acts with the opposite ends against the annular stop (6) and against the intermediate stop (43) of the rod (4) moving same towards a front position. In said front position, the intermediate stop (43) of the rod makes contact with a front stop (14) of the horizontal hole (12), and the frontal appendage (42) is located in the most forward position inside the vertical hole (11) for mounting the cutting tool (2).

Figure 5:
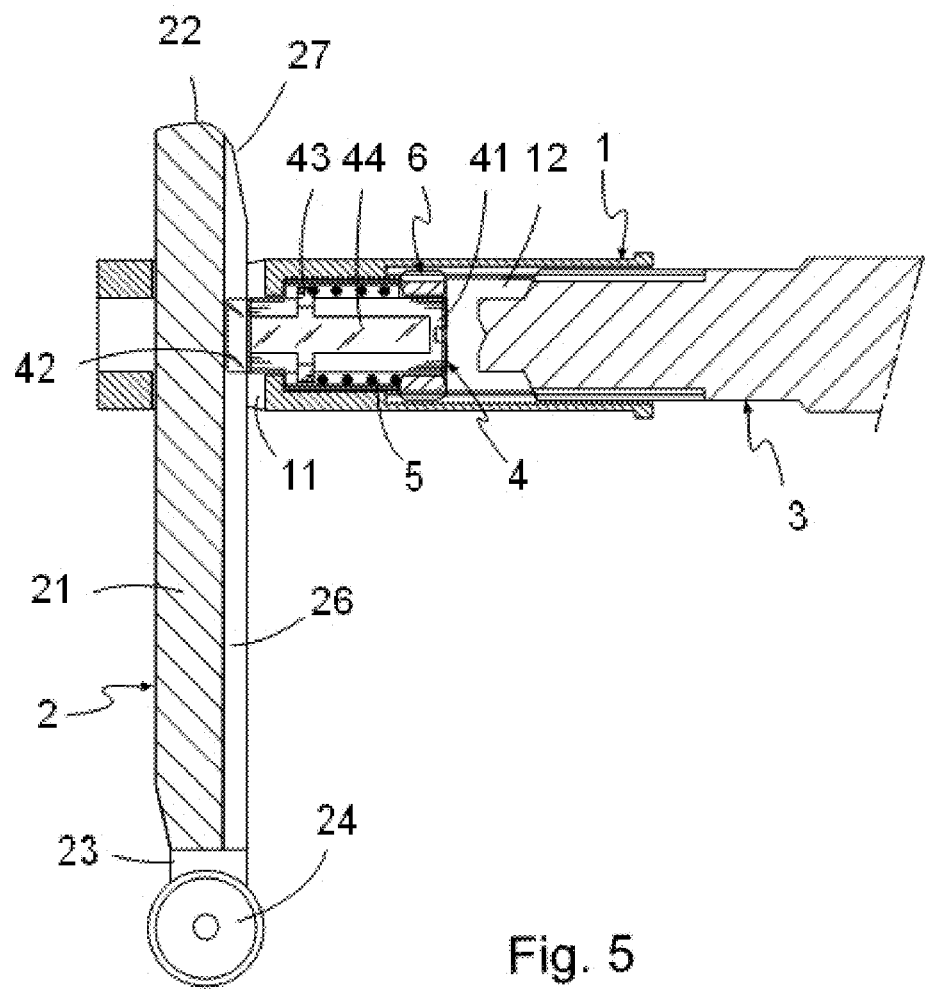
FIG. 5 shows a view similar to FIG. 3, with the cutting tool mounted on the support and the handle in the rear position for releasing said cutting tool.

As shown in FIG. 3, when inserting the first end (22) of the bar of the cutting tool (2) in the vertical hole (11) of the support (1), said bar (21) acts with the ramp (27) against the frontal appendage (42) of the rod (4) causing its backward movement, which allows the bar (21) to be inserted and moved vertically in the vertical hole (11), said frontal appendage (42) being accommodated in the longitudinal groove (26) of the cutting tool (2) as shown in FIG. 5.

In this position, the rod (4) exerts pressure against the longitudinal groove (26) of the cutting tool (2), due to the push of the spring (5), although the handle is in a rear position, spaced apart from the rod (4). This pressure is sufficient to prevent the cutting tool (2) from falling under its own weight, however allowing the cutting tool (2) to be manually moved in the vertical direction to place same at the desired height.

Figure 6:
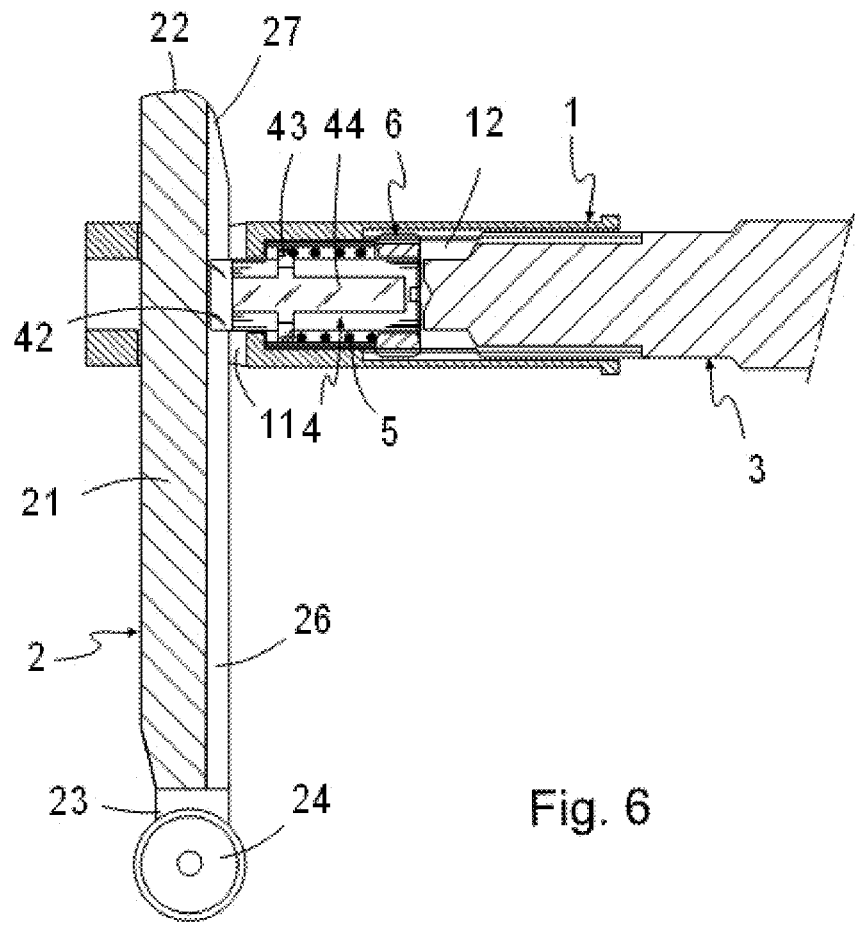
FIG. 6 shows a view similar to FIG. 5, once the handle has been moved towards a front position for locking the cutting tool, in which the rod presses against said cutting tool.

Once the cutting tool (2) has been positioned at the chosen height, it is sufficient to thread the handle (3) into the rear threaded segment (13) of the support (1) so that said handle presses the rod (4) against the cutting tool (2), locking same in the chosen position, as shown in FIG. 6.

Figure 7:
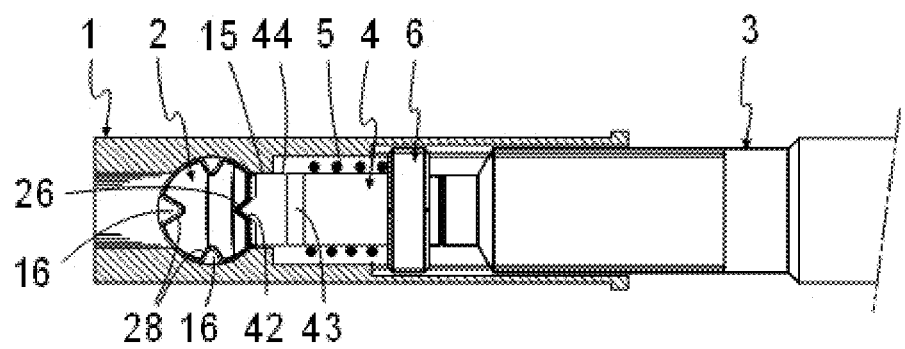
FIG. 7 shows a plan view of an embodiment variant of the device of the invention with the rod and handle in the same position as FIG. 6, in which the bar of the cutting tool and the vertical hole comprise additional and respectively longitudinal, lateral and rear channels, and radial appendages accommodated in said longitudinal channels.

To prevent its rotation inside the support (1), the rod (4) has facing lateral planes (44) that are parallel to other lateral planes (15), referenced in FIG. 7 and defined in a hole that connects the horizontal hole (12) with the vertical hole (11) of the support and through which said rod (4) accesses the inside of the vertical hole (11) to act with its frontal appendage (42) against the longitudinal groove (26) of the cutting tool (2).

In the exemplary embodiment shown, both the frontal appendage (42) of the rod (4) and the longitudinal groove (26) of the cutting tool (2) exhibit parallel vertical surfaces that converge towards the front end of the frontal appendage (42) of the rod (4) and towards the bottom of the longitudinal groove (26) of the cutting tool (2), and which exhibit the same inclinations. In the exemplary embodiment shown, the frontal appendage (42) of the rod and the longitudinal groove (26) of the front face of the bar of the cutting tool exhibit a triangular cross section.

In the embodiment shown in FIG. 7, the bar (21) additionally comprises on the lateral and rear faces longitudinal channels (28) for receiving radial appendages (16) defined in the vertical hole (11) of the support (1) and that collaborate with the longitudinal groove (26) and with the frontal appendage (42) of the rod (4) in the centring and alignment of the cutting tool (2).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A cutting device for manual ceramic cutters, comprising:
    a support provided with a vertical hole in which a cutting tool is accommodated, the support being further provided with a horizontal hole with at least a rear threaded segment in which a handle is mounted acting as a lever for moving the support and actuating the cutting tool;
    wherein said cutting tool comprises a bar provided with a first end accommodated through the vertical hole of the support and a second end carrying a cutting wheel for marking a break line in ceramic pieces to be cut, and a frontal face of the bar facing the horizontal hole of the support;
    wherein the bar of the cutting tool comprises a longitudinal groove on said frontal face, and
    wherein the cutting device further comprises:
        a rod mounted in the horizontal hole of the support capable of longitudinal movement and the rod having at a front end a frontal appendage which is located inside the vertical hole of the support and which is accommodated in the longitudinal groove of the cutting tool, immobilizing said cutting tool when said rod is pushed by the handle towards a front position for locking the cutting tool; and
        a spring configured to act against the rod and move the rod towards the front position for locking the cutting tool.

2. The cutting device according to claim 1, wherein the bar of the cutting tool comprises at said first end a ramp, inclined towards the frontal face of the bar, which acts against the frontal appendage of the rod during insertion of the first end of the cutting tool into the vertical hole of the support and causes a backward movement of the rod until said frontal appendage is accommodated in the longitudinal groove of the cutting tool.

3. The cutting device according to claim 1, wherein the spring is mounted between an intermediate stop of the rod and an annular stop, threaded mounted on the rear threaded segment of the support so that the annular stop has an adjustable position.

4. The device according to claim 1, wherein the horizontal hole of the support comprises a front stop facing an intermediate stop of the rod, and the contact of said intermediate stop with the front stop determines an extreme forward position of the rod with respect to the horizontal hole of the support.

5. The device according to claim 1, wherein the frontal appendage of the rod and the longitudinal groove of the cutting tool have converging walls, having same inclinations.

6. The device according to claim 5, wherein the frontal appendage of the rod and the longitudinal groove of the frontal face of the bar of the cutting tool have a triangular or isosceles trapezoidal cross section.

* * * * *